June 7, 1932.  F. P. HERMAN  1,862,400
POWER TAKE-OFF MECHANISM FOR AUTOMOBILES
Filed Jan. 14, 1930  2 Sheets-Sheet 1
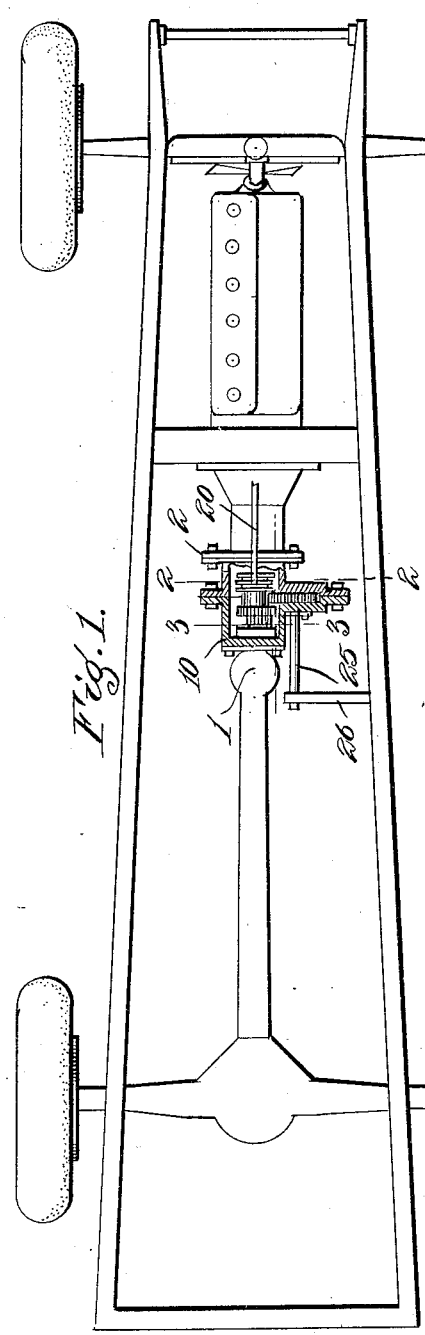
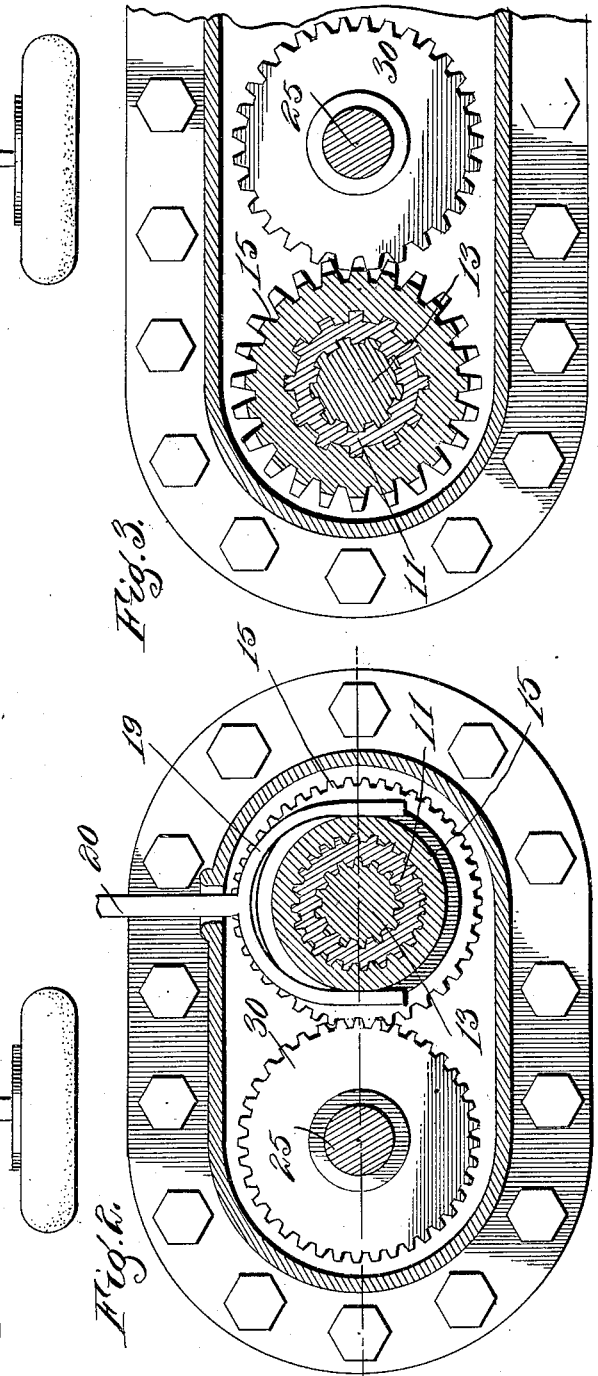
INVENTOR
F. P. Herman
BY
ATTORNEY
WITNESS

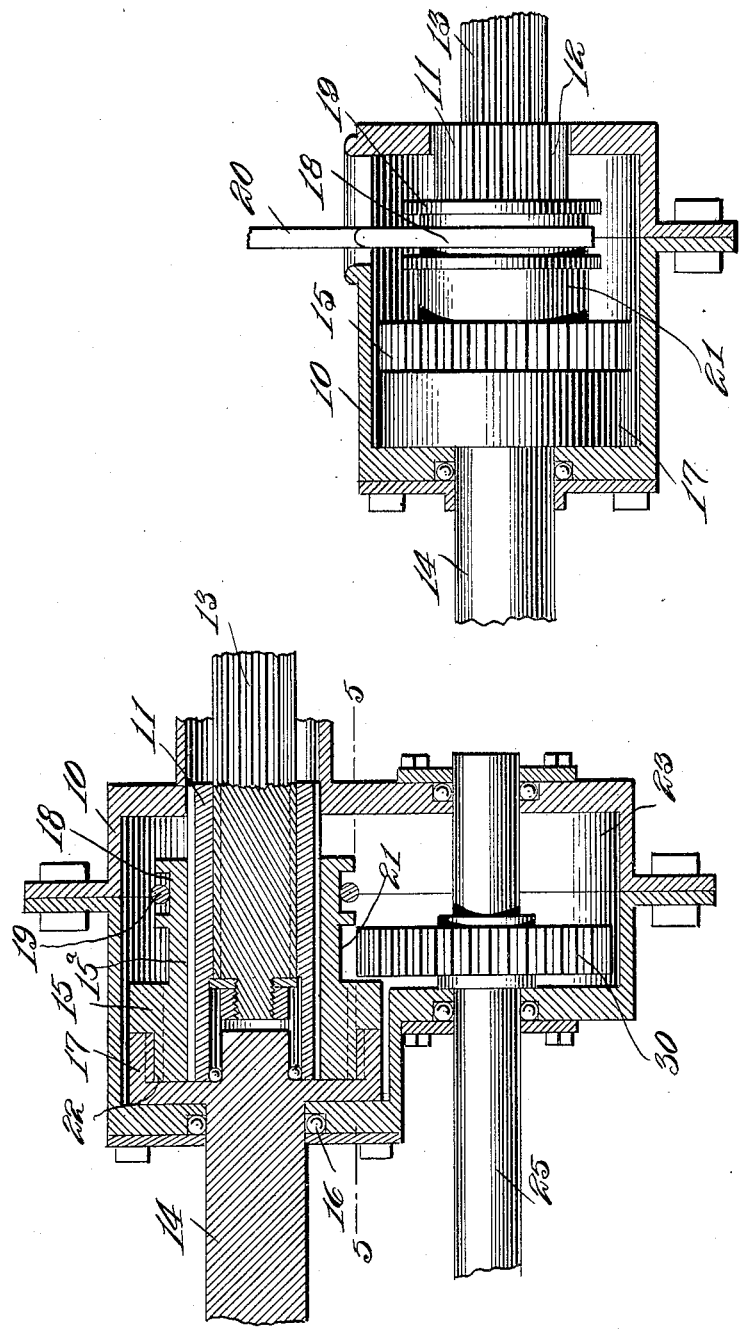

Patented June 7, 1932

1,862,400

UNITED STATES PATENT OFFICE

FRED P. HERMAN, OF McCAMEY, TEXAS

POWER TAKE-OFF MECHANISM FOR AUTOMOBILES

Application filed January 14, 1930. Serial No. 420,798.

This invention relates to power take-off mechanism and more particularly to mechanism of this character for use in connection with automobiles.

A primary object of the invention is to provide a mechanism of this character so constructed that it can be readily attached to any motor vehicle at a very small cost and when once applied will remain permanently on the car to be shifted for use as a power take-off or for driving the vehicle as may be desired.

Another object of the invention is to so construct a mechanism of this character that it may be substituted for the universal joint found on all motor cars and the joint attached to the mechanism which latter is capable of being shifted so that when the engine is operated it may be used either for driving the vehicle or for operating the take-off to supply power for running other machinery.

Another object is to provide an auxiliary transmission mechanism for taking off power from the driving shaft of an automobile adapted to be interposed between the auto driving shaft and its driven shaft and so constructed, mounted and controlled, that it may be thrown into or out of operation at will and which will not in any way interfere with the driving mechanism of the automobile.

Still another object is to so construct, mount and control such an auxiliary transmission whereby the driven and driving shafts of an automobile may be drivingly associated with the engine through such auxiliary transmission mechanism when the latter is not in use in operating the power take-off shaft.

In carrying out these objects, the invention is susceptible of a wide range of modification without departing from the spirit or sacrificing any of the advantages of the claimed invention; there being shown in the accompanying drawings for illustrative purposes a preferred and practical form, in which:

Figure 1 represents a top plan view of the vehicle chassis with this improved mechanism shown applied and in section;

Fig. 2 is a transverse section taken on the line 2—2 of Fig. 1;

Fig. 3 is a similar view taken on the line 3—3 of Fig. 1;

Fig. 4 is an enlarged detail horizontal section through the mechanism constituting this invention; and Fig. 5 is a longitudinal section taken on the line 5—5 of Fig. 4.

In the embodiment illustrated the universal joint 1 which connects the transmission with the differential is usually attached to the flange 2. When this improved take-off mechanism is to be embodied or applied to the car the universal joint is removed and the casing 10 is substituted therefor and bolted to the flange 2. Located within this casing is a transmission mechanism constituting this invention and which comprises a spline sleeve 11 provided on its outer face with a plurality of logitudinally extending grooves 12 which provide a corrugated or toothed circumference designed to be slidably and interlockingly engaged with a spline gear sleeve 15 as will be presently more fully described. The bore of this spline sleeve 11 is made polygonal in cross section to adapt it to fit on the sliding gear shaft 13 from which the universal joint 1 was removed. Arranged in alinement with the main sliding gear shaft 13 in the rear wall of the casing 10 is a shaft 14 mounted on ball bearings 16 to insure its ready turning and to which the universal joint 1 is designed to be connected, the connection not being here shown since it may be made in the usual or any desired manner. On the front end of the shaft 14 in the casing 10 is an internal gear wheel or clutch member 17 here shown made integral with the shaft 14 and the front end of said shaft projecting beyond the attachment of the wheel 17 thereto and being reduced and having a ball bearing connection with the sleeve 11. The interior of the rear end of sleeve 11 is made circular and is arranged as shown in Fig. 4 so that the sleeve 11 may turn independently of the shaft 14 and which it is designed to do when the take-off gear 30 is connected with the sleeve by means presently to be described.

The spline gear sleeve or clutch member 15 is mounted to slide longitudinally on the sleeve 11 and is equipped with an annular groove 18 to receive the forked end 19 of the shifting lever 20. This sleeve 15 has a toothed portion 21 between the gear proper 15a and the lever channel 18 and in rear of said gear 15a is a corrugated extension 22 which is designed to fit into the internal gear or cooperating clutch member 17 and be interlockingly engaged therewith when so positioned and by means of which the sleeve 11, the shaft 13 to which said sleeve is fixed and the pinion shaft 14 are connected to turn in unison as shown in Fig. 4. When the parts are so connected the driving shaft 13 will operate the pinion shaft 14 and drive the vehicle on which the device is mounted.

Spaced laterally from the shaft 14 and shaft 13 which are in longitudinal alinement is another shaft 25 which extends through a chamber 23 formed at one side of the casing 10 and which is journalled to rotate in the end walls of said chamber on suitable ball bearings. This shaft 25 constitutes the power take-off shaft and is connected by any suitable means indicated at 26 in Fig. 1 for transmitting power to any other machinery to be driven.

Fixed to the shaft 25 within the chamber 23 is a gear 30 which is designed to mesh with the gear 15a when the sleeve carrying said gear is shifted by means of the lever 20 to its extreme forward position as shown in Fig. 2. When this spline gear 15a is so shifted as to mesh with the gear 30 it will be out of engagement with the internal gear 17 and thereby permit it to turn independently of said gear and the shaft 14 carried thereby so that the driving mechanism for the vehicle will thus be thrown out of action and the driving shaft 13 connected to drive the power take-off shaft 25.

From the above description it will be seen that this mechanism when applied to an automobile may remain permanently thereon and by means of the lever 20 may be shifted so as to throw the take-off mechanism into or out of operation at the will of the user and when out of operation the driving mechanism of the car will be operated and the car may be driven in the usual manner.

It is of course to be understood that any suitable means may be employed for taking off the power from the shaft 25.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. A power take-off apparatus for automobiles comprising a spline sleeve having a portion of its bore angular to fit the sliding gear shaft of an automobile, a shaft to fit and turn loosely in said sleeve, an internally toothed clutch member fixed to said shaft, another sleeve mounted to slide on and turn with said spline sleeve, a clutch member carried by said second sleeve to slide into and mesh with said first mentioned clutch member, another gear carried by said second sleeve, a power shaft having a gear fixed thereto and adapted to mesh with the second gear on the second sleeve when the latter is disengaged from the internally toothed clutch member thereby releasing the shaft on which said clutch member is mounted and connecting up the power take-off shaft with the sliding gear shaft.

2. In combination with a main transmission mechanism including a sliding gear shaft; of an auxiliary transmission including a spline sleeve and a driving shaft arranged in alinement with the sleeve, said sleeve having an angular bore portion for connection with said sliding gear shaft and a cylindrical bore portion to receive said driving shaft to adapt the driving shaft and sleeve to turn independently of each other, an internally toothed clutch member fixed to said driving shaft, a gear sleeve mounted to slide on said spline sleeve and turn therewith, gears on said gear sleeve one of which is adapted to slide into and interlockingly engage said clutch member and thereby connect said driving and driven shafts, another gear on said gear sleeve, and a gear carrying take-off shaft arranged parallel with said gear sleeve, said gear sleeve being shiftable to bring the take-off shaft gear into mesh with a gear on said sleeve and to disengage said gear sleeve from said internally toothed clutch member thereby connecting up to the take-off shaft for operation and disconnecting the driven shaft.

3. The combination with a main transmission mechanism including a sliding gear shaft, and a universal joint; of an auxiliary transmission arranged between the sliding gear shaft and said universal joint, said auxiliary transmission comprising a spline sleeve for connection with said sliding gear shaft, a shaft for connecting said sleeve with the universal joint, an internally toothed clutch member carried by the said connecting shaft, a sleeve mounted to slide on said spline sleeve and to turn therewith, a clutch gear carried by said sliding sleeve adapted to extend into and mesh with said first mentioned clutch member for connecting the spline sleeve with the connecting shaft, another gear carried by said sliding sleeve, a power take-off shaft arranged parallel with said spline sleeve and connecting shaft, a gear fixed to said take-off shaft, and positioned to be engaged with the gear of the sliding sleeve when the latter is withdrawn from engagement with the internally toothed clutch member thereby disconnecting the driven shaft and connecting the driving shaft with the take-off shaft, and means for shifting said sleeve.

FRED P. HERMAN.